United States Patent
Acharya et al.

(10) Patent No.: US 7,769,884 B2
(45) Date of Patent: Aug. 3, 2010

(54) NETWORK ROUTE CONTROL

(75) Inventors: Arup Acharya, Nanuet, NY (US); Debanjan Saha, Mohegan Lake, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 10/698,126

(22) Filed: Oct. 31, 2003

(65) Prior Publication Data

US 2005/0108386 A1  May 19, 2005

(51) Int. Cl.
*G06F 15/173* (2006.01)
(52) U.S. Cl. ...................................... 709/238; 709/223
(58) Field of Classification Search .................. 709/224, 709/238, 223
See application file for complete search history.

(56) References Cited

U.S. PATENT DOCUMENTS

| | | | |
|---|---|---|---|
| 7,133,365 B2 * | 11/2006 | Klinker et al. | 370/238 |
| 2001/0044842 A1 * | 11/2001 | Kawakami | 709/223 |
| 2003/0079005 A1 * | 4/2003 | Myers et al. | 709/223 |
| 2004/0210670 A1 * | 10/2004 | Anerousis et al. | 709/238 |

* cited by examiner

*Primary Examiner*—George C Neurauter, Jr.
*Assistant Examiner*—Anish Sikri
(74) *Attorney, Agent, or Firm*—Ference & Associates LLC

(57) ABSTRACT

The use of multi-homing to multiple network providers to improve performance of network applications is disclosed. In accordance with the present invention, a general purpose computer performs primary route control functions, without requiring a special route control device. Route selection is made in accordance with desired metrics which may include relevant to performance, availability, or cost.

19 Claims, 3 Drawing Sheets

SERVER-BASED ROUTE CONTROL WITH VIRTUAL LANs (VLANs)

DIAGRAM OF MULTIHOMING TO TWO ISPs USING ROUTE CONTROL DEVICE

SERVER-BASED ROUTE CONTROL WITH MPLS

SERVER-BASED ROUTE CONTROL WITH VIRTUAL LANs (VLANs)

NETWORK ROUTE CONTROL

FIELD OF THE INVENTION

The present invention generally relates to the computer networks and computer systems and, more specifically, to implementation of route control for networks that are multi-homed to multiple network providers.

BACKGROUND OF THE INVENTION

Large enterprises and content providers, who depend on the Internet to operate their businesses, require a high level of reliability from their network connections. Increasingly, these large consumers and producers of network data are turning to multi-homing as a technique to achieve resilience to service interruptions. Multi-homing is defined simply as a customer (or Internet Service Provider ["ISP"]) network having more than one external link, either to a single ISP, or to different providers. The customer typically has its own public Autonomous System ("AS") number, and advertises its address prefixes via all of its upstream providers using Border Gateway Protocol ("BGP"). See BGP4: Inter-Domain Routing in the Internet by John W. Stewart, Addison-Wesley Pub. Co. (1st ed. 1998) or Internet Engineering Task Force (IETF) Request for Comments (RFC) 1771, for a general discussion of the Border Gateway Protocol.

While multi-homing to multiple providers is motivated primarily by a need for link-level and provider-level fault tolerance, recently developed "intelligent route control" devices and services allow subscribers to leverage multi-homing for more than just increased resilience. For example, performance to different parts of the network may vary depending on which upstream provider is used. In such situations, careful route selection can significantly improve performance. Even availability can be managed to some extent by choosing ISPs that have sufficiently diverse connectivity to destinations of interest.

Route control solutions require two main components: measurement of the candidate links, and control to steer outgoing traffic over the best performing link. The measurement component typically measures the delay and loss over upstream provider links to various destinations in the network. Using these measurements, the best provider to reach a particular destination can be identified. Once the best provider is identified, however, traffic to the destination must be directed over the appropriate link. Current solutions achieve this link/ISP selection by interacting with the BGP router(s) connecting the data center to the ISP, usually with an external device adjunct to the router making this selection.

Current solutions are implemented as network appliances deployed in data center or enterprise networks. These appliances typically measure delays and availability over each ISP link using passive and active probing techniques such as observing Transmission Control Protocol ("TCP") connection establishment delay, or using network pings. These low-level measurements are not application-specific, which means that the delay measurements must be translated into a metric that is meaningful for the application communicating over the network. In the currently available solutions, route control is done by modifying BGP forwarding tables so that traffic destined for a particular network uses the best-performing ISP based on observed performance. This requires installation of the appliance near the edge routers in the network, and complex router configuration to allow the appliance to direct traffic over links that may be contrary to the choice made by the standard BGP protocol.

SUMMARY OF THE INVENTION

The invention broadly contemplates any network-connected general purpose computer performing route control functions, without the need for external network appliances or direct interaction with BGP routers, as done in traditional approaches.

In summary, one aspect of the invention provides a method for network route control, the method comprising the steps of: establishing a connection between a general purpose computer and arrangements for linking to multiple internet service providers (ISPs); measuring relevant performance and availability metrics of said links; and said computer directs network traffic to the best link based upon said relevant performance and availability metrics.

Another aspect of the present invention provides an apparatus permitting a general purpose computer to perform route control, the apparatus comprising: an arrangement for establishing a link between a general purpose computer and multiple internet service providers (ISPs); an arrangement allowing said computer to measure at least one relevant performance metric of said links; and an arrangement allowing said computer to select the best route based upon said link performance.

Furthermore, an additional aspect of the invention provides a program storage device readable by machine, tangibly embodying a program of instructions executable by the machine to perform method steps for general purpose computer route control, said method comprising the steps of: establishing a connection between a general purpose computer and arrangements for linking to multiple internet service providers (ISPs); measuring relevant performance metrics of said links; and said computer directs network traffic to the best link based upon said relevant performance and availability metrics.

For a better understanding of the present invention, together with other and further features and advantages thereof, reference is made to the following description, taken in conjunction with the accompanying drawings, and the scope of the invention that will be pointed out in the appended claims.

DESCRIPTION OF THE PREFERRED EMBODIMENTS

The present invention applies to environments in which network subscribers are multi-homed to multiple network providers, or ISPs. An example of this scenario is shown in FIG. 1, a diagram showing the configuration of the computer network system in which network subscribers are multi-homed to multiple network providers or Internet service providers using a route control device in accordance with the prior art.

Figure 1:
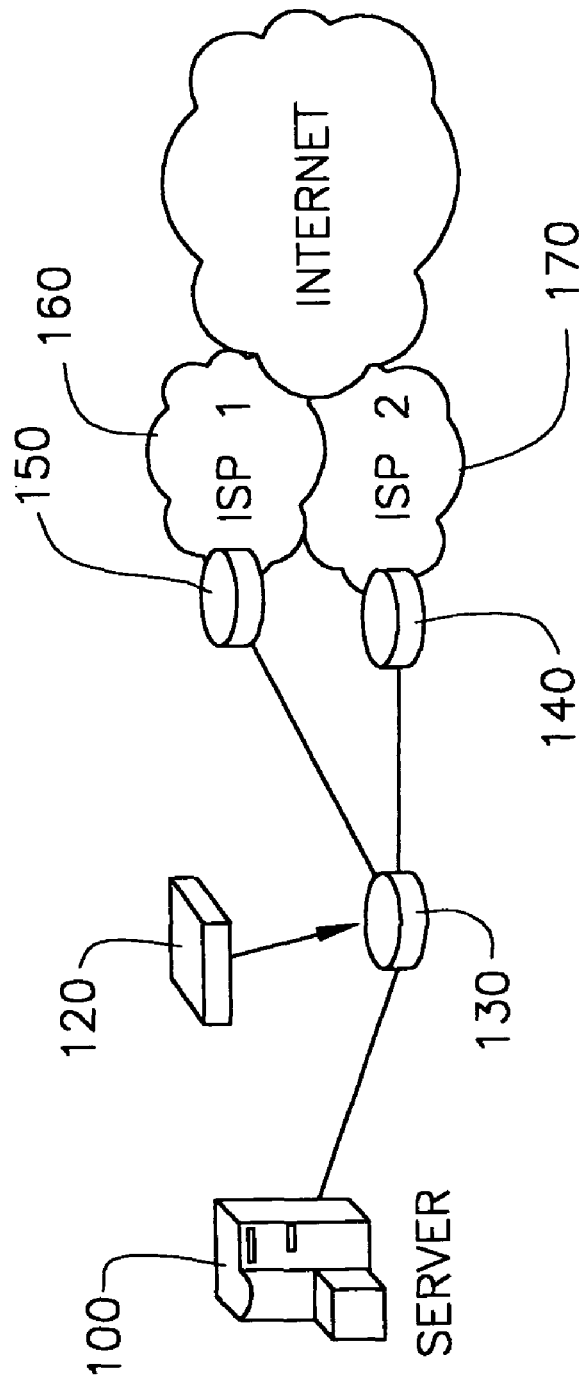
FIG. 1 is a schematic diagram showing the configuration of the computer network system in which network subscribers are multi-homed to multiple network providers or Internet service providers using a route control device in accordance with the prior art.

In FIG. 1, the enterprise 100 is connected to two ISPs, shown as "ISP 1" 160 and "ISP 2" 170, with edge router 130 on the customer premises connected to border routers 140 and 150 in each of the ISPs. In accordance with present practice, route control is achieved by having a route control device 120 monitor the delay or loss on each of the ISP links using active or passive measurements, and then updating the BGP forwarding tables on the edge router to reflect the route control decision for destinations of interest.

The present invention removes the need for a dedicated route control device and instead permits general purpose computers to perform route control functions themselves. In the preferred embodiment, a general purpose computer hosting applications which can benefit from route control supports the Multi-protocol Label Switching (MPLS) protocol in its native operating system networking stack. For a general description of MPLS, see Internet Engineering Task Force (IETF) Request for Comments (RFC) 3031. Moreover, the devices in the customer premises network (e.g., switches, routers) between the general purpose computer and the edge routers are MPLS-enabled. This implies that they can perform the label switching function of Label Switched Routers (LSRs) (this function is also described in IETF RFC 3031). The network administrator, through some manual or automated means, establishes multiple MPLS label-switched paths (LSPs) between the general purpose computer and the edge routers, with one LSP for each service provider link. At the edge router, the label corresponding to each LSP is used to determine on which link the packet is forwarded. This scenario is shown in FIG. 2, a diagram showing the configuration of the computer network system using a general purpose computer to select Internet routes according to one embodiment of the present invention.

Figure 2:
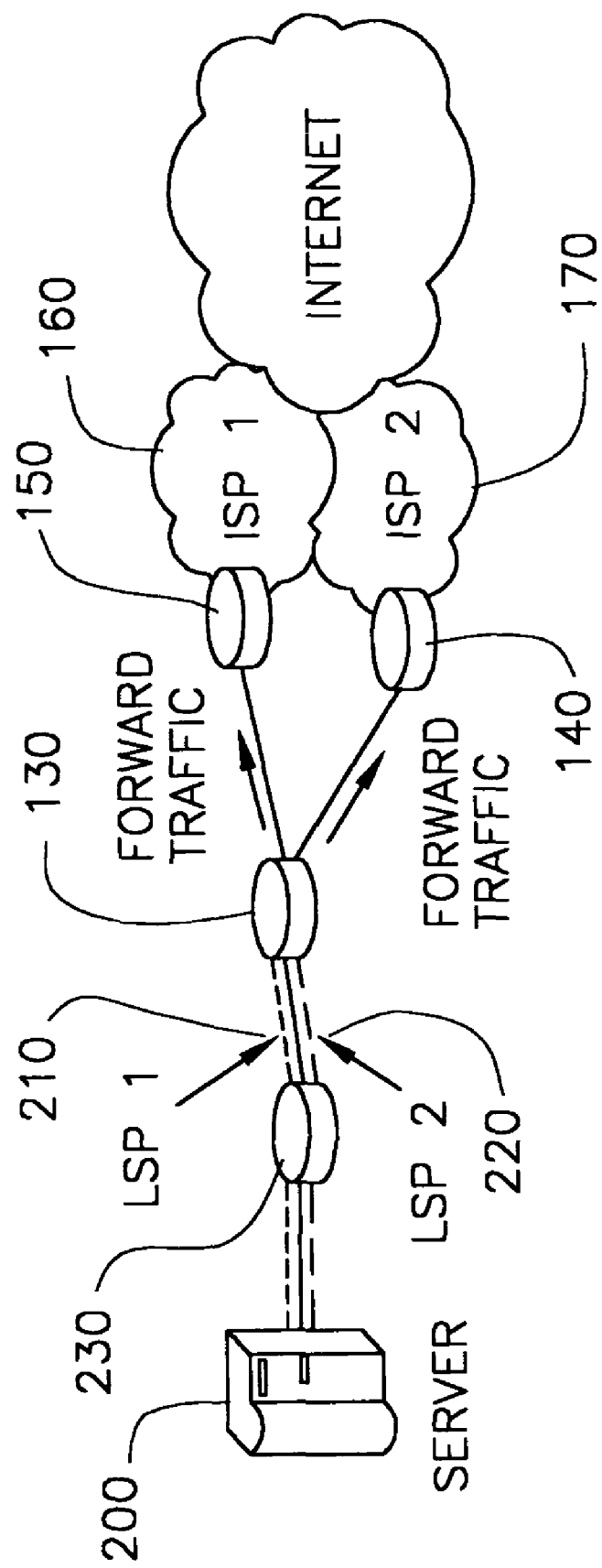
FIG. 2 is a schematic diagram showing the configuration of the computer network system using a general purpose computer to select Internet routes according to one embodiment of the present invention.

In FIG. 2, utilizing router 230, LSP 1 at 210 and LSP2 at 220 are configured between the general purpose computer 200 and the edge router 130. Packets sent by the general purpose computer with a label corresponding to LSP 1 is forwarded by the edge router on the link to ISP 1. Packets sent on LSP 2 are similarly forwarded toward ISP 2.

For the general purpose computer to make route control decisions, it must be able to measure the relative performance or availability on each of the provider links. This can be done with either active or passive measurement of metrics of interest. For active probing, the general purpose computer can send multiple probes toward a destination, one on each LSP to measure the performance on each link. For example Internet Control Message Protocol ("ICMP") echo (i.e., ping) packets can be sent over each link to compare the round-trip delay or packet loss on each link. For a general description of this process, see chapters 6 and 7 of TCP/IP Illustrated Volume 1: The Protocols by W. Richard Stevens, Addison-Wesley Pub. Co. (1st ed. 1994).

For passive performance measurement of each ISP link, the applications running on the general purpose computer can respond to incoming requests using a specified link by sending the reply on different LSPs, and thus different ISP links. By using normal application interactions with actual clients, the general purpose computer has the flexibility to measure performance metrics in an application-specific manner.

Once sufficient performance or availability measurement samples are obtained for each ISP link, the general purpose computer can direct outgoing application traffic over the most appropriate (e.g., best performing) link. The route control decision is implemented in a manner similar to that used for collecting measurements, namely by sending packets on the appropriate LSP. The route control decision may be based on a number of metrics, including, but not limited to, network delay, loss, and throughput or application-layer response time. The route control decision can be made on a per-destination basis, or on using some level of aggregation to group clients.

Figure 3:
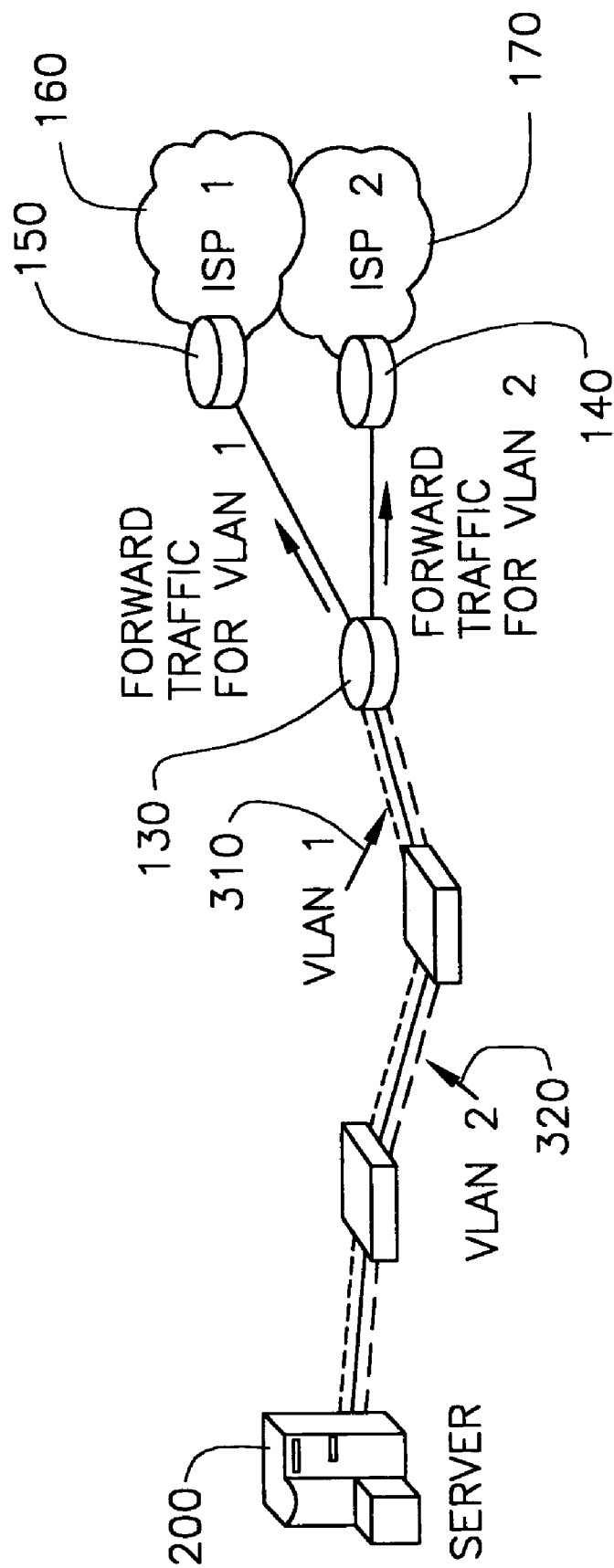
FIG. 3 is a schematic diagram showing the configuration of the computer network system using a general purpose computer to select Internet routes according to another embodiment of the present invention.

In another embodiment, the general purpose computer can use different Virtual Local Area Network ("VLAN") identifiers within the subscriber network to correspond to different outgoing links. VLANS are generally described in The Switch Book by Rich Seifert, John Wiley and Sons (1st. ed. 2000). Referring now to FIG. 3, the edge 130 uses VLAN identifiers 310 and 320 to forward packets on a specific IP link. By transmitting packets on a specified VLAN, the general purpose computer 200 can ensure that a particular ISP link is used. These VLANs are established within the subscriber network using some manual or automated means. The measurements and route control mechanism operate similarly to the MPLS embodiment described above. In this method, instead of using MPLS labels to designate the outgoing link, VLAN identifiers are used for this purpose.

Another embodiment uses Internet Protocol ("IP") level tunnels (such as IP-IP, or Generic Routing Encapsulation (GRE) based) to direct packets to a specified outgoing ISP link (see IETF RFC 2003 and RFC 2784). These tunnels, once established, can be assigned to different virtual interfaces on the general purpose computer, with each interface corresponding to a different ISP link. Packets can then be directed by the general purpose computer by transmitting them on a specified virtual interface. At the edge router, packets that arrive on a specified tunnel are forwarded on the corresponding ISP link.

It is to be understood that the present invention, in accordance with at least one presently preferred embodiment, includes an arrangement for establishing a link between a general purpose computer and multiple internet service providers (ISPs), an arrangement allowing said computer to measure relevant performance metric of said links, and an arrangement allowing said computer to select the best route based upon said link performance, all of which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising the steps of:
    establishing a connection between a general purpose computer and a router linking said general purpose computer to at least a first internet service provider and a second internet service provider, the general purpose computer being situated at an edge of a network and configured to originate outgoing packets;

utilizing the general purpose computer to perform one or more of active and passive measuring of relevant performance and availability metrics of links to the at least first internet service provider and the second internet service provider; and utilizing the general purpose computer for performing network route control functions, said network route control functions comprising labeling outgoing packets for an internet service provider specific path prior to sending the outgoing packets to the router;

wherein said general purpose computer performs the routing control functions based upon said relevant performance and availability metrics; and wherein the general purpose computer is configured to perform the network route control functions without external network appliances and without a dedicated route control device.

2. The method according to claim 1, wherein said specific path comprises a Multi-protocol Label Switching (MPLS) switched path; and wherein the general purpose computer sends the outgoing packets labeled with one of a first label corresponding to a first switched path and a second label corresponding to a second switched path.

3. The method according to claim 1, wherein said specific path comprises a Virtual Local Area Network (VLAN) tunnel; and wherein the general purpose computer sends packets with VLAN identifiers.

4. The method according to claim 1, wherein said ISP specific path comprises an Internet protocol (IP)-level tunnel; and wherein different IP-level tunnels are assigned to different virtual interfaces on the general purpose computer, each virtual interface corresponding to a different ISP link.

5. The method according to claim 1, wherein the relevant performance and availability metrics comprise network delay.

6. The method according to claim 1, wherein the relevant performance and availability metrics comprise network loss.

7. The method according to claim 1, wherein the relevant performance and availability metrics comprise network throughput.

8. The method according to claim 1, wherein the relevant performance and availability metrics comprise application-layer response time.

9. The method according to claim 1, wherein the step of measuring relevant performance and availability metrics comprises making passive measurements, wherein the general purpose computer utilizes applications running on the general purpose computer to measure the relevant performance metrics in an application-specific manner.

10. A program storage device readable by machine, tangibly embodying a program of instructions executable by the machine to perform steps comprising:

establishing a connection between a general purpose computer and a router linking said general purpose computer to at least a first internet service provider and a second internet service provider, the general purpose computer being situated at an edge of a network and configured to originate outgoing packets;

utilizing the general purpose computer to perform one or more of active and passive measuring of relevant performance and availability metrics of links to the at least first internet service provider and the second internet service provider; and utilizing the general purpose computer for performing network route control functions, said network route control functions comprising labeling outgoing packets for an internet service provider specific path prior to sending the outgoing packets to the router;

wherein said general purpose computer performs the routing control functions based upon said relevant performance and availability metrics; and wherein the general purpose computer is configured to perform the network route control functions without external network appliances and without a dedicated route control device.

11. A multi-homed network-connected general purpose computer comprising:

a processor; and a program storage device tangibly embodying a program of instructions executable to perform:

originate outgoing packets labeled for a specific path corresponding to one of a first internet service provider and a second internet service provider;

establishing a connection between the multi-homed network-connected general purpose computer and the first internet service provider and the second internet service provider;

utilizing one or more of active and passive measuring of relevant performance and availability metrics of links to the first internet service provider and the second internet service provider; and performing network route control functions, said control functions comprising labeling an outgoing packet for an internet service provider specific path prior to sending the packet to a router;

wherein said multi-homed network-connected general purpose computer is configured to perform the routing control functions based upon said relevant performance and availability metrics; and wherein the multi-homed network-connected general purpose computer is configured to perform the network route control functions without external network appliances and without a dedicated route control device.

12. The multi-homed network-connected general purpose computer according to claim 11, wherein the specific path comprises a Multi-protocol Labeled Switching switched path; and wherein the multi-homed network-connected general purpose computer is configured to send packets labeled with one of a first label and a second label corresponding to one of a first Multi-protocol Label Switching switched path and a second Multi-protocol Label Switching switched path in an application specific manner based on the relevant performance and availability metrics.

13. The multi-homed network-connected general purpose computer according to claim 11, wherein the multi-homed network-connected general purpose computer is configured to label packets with Virtual Local Area Network (VLAN) identifiers specifying a specific IP link on which packets should be forwarded in an application specific manner based on the relevant performance and availability metrics.

14. The multi-homed network-connected general purpose computer according to claim 11, wherein the multi-homed network-connected general purpose computer is configured to label the packets for internet protocol (IP)-level tunnels assigned to different virtual interfaces on the multi-homed network-connected general purpose computer, each virtual interface corresponding to a different ISP link.

15. The multi-homed network-connected general purpose computer according to claim 11, wherein the relevant performance metrics comprise network delay.

16. The multi-homed network-connected general purpose computer according to claim 11, wherein the relevant performance metrics comprise network loss.

17. The multi-homed network-connected general purpose computer according to claim 11, wherein the relevant performance metrics comprise network throughput.

18. The multi-homed network-connected general purpose computer according to claim 11, wherein the relevant performance metrics comprise application-layer response time.

19. The multi-homed network-connected general purpose computer according to claim 11, wherein the multi-homed network-connected general purpose computer is configured to make passive measurements utilizing applications running on the multi-homed network-connected general purpose computer to measure at least one relevant performance metric in an application-specific manner.

* * * * *